US012482437B2

(12) United States Patent
Chen

(10) Patent No.: US 12,482,437 B2
(45) Date of Patent: Nov. 25, 2025

(54) METHOD AND SYSTEM FOR CALCULATING ADAPTIVE PANEL COLOR PARAMETERS

(71) Applicant: REALTEK SEMICONDUCTOR CORP., Hsinchu (TW)

(72) Inventor: Li-Ming Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/659,084

(22) Filed: May 9, 2024

(65) Prior Publication Data

US 2024/0386866 A1 Nov. 21, 2024

(30) Foreign Application Priority Data

May 17, 2023 (TW) ................................ 112118216

(51) Int. Cl.
*G09G 5/06* (2006.01)
*G09G 5/00* (2006.01)

(52) U.S. Cl.
CPC ............... *G09G 5/06* (2013.01); *G09G 5/006* (2013.01); *G09G 2320/041* (2013.01); *G09G 2320/0626* (2013.01); *G09G 2320/0666* (2013.01)

(58) Field of Classification Search
CPC .... G09G 5/06; G09G 5/006; G09G 2320/041; G09G 2320/0626; G09G 2320/0666
See application file for complete search history.

(56) References Cited

U.S. PATENT DOCUMENTS

| | | | | |
|---|---|---|---|---|
| 2010/0091039 | A1* | 4/2010 | Marcu | G09G 5/06 345/690 |
| 2019/0121522 | A1* | 4/2019 | Davis | G06V 40/28 |
| 2021/0134209 | A1* | 5/2021 | Shih | G06F 3/1423 |

FOREIGN PATENT DOCUMENTS

TW 201027509 A1 7/2010

* cited by examiner

*Primary Examiner* — Robert J Michaud

(74) *Attorney, Agent, or Firm* — Li & Cai Intellectual Property (USA) Office

(57) ABSTRACT

A method for calculating adaptive panel color parameters and an adaptive panel-color-parameter calculation system are provided. The adaptive panel-color-parameter calculation system embodies an arithmetic circuit that is implemented by a circuitry or a firmware, and can be operated in a control circuit that controls an on-screen menu and display parameters of a display panel. In the method, current environmental parameters of the display panel, such as an electric current and a temperature, are acquired, and color characteristic parameters can be obtained by querying a panel-characteristic lookup table. Afterwards, a color transfer matrix is updated according to the obtained color characteristic parameters as compared to a target value. The color transfer matrix is used to derive a new set of panel color parameters that are provided to a driver circuit of the display panel. The display panel then displays a picture with the new set of panel color parameters.

16 Claims, 5 Drawing Sheets

| current\temperature | temperature 0 | temperature 1 | … | temperature n |
| --- | --- | --- | --- | --- |
| current 0 | parameter (0,0)=x,y of R, G, B, W | parameter (1,0)=x,y of R, G, B, W | … | parameter (n,0)=x,y of R, G, B, W |
| current 1 | parameter (0,1)=x,y of R, G, B, W | parameter (1,1)=x,y of R, G, B, W | … | parameter (n,1)=x,y of R, G, B, W |
| … | … | … | … | … |
| current n | parameter (0,n)=x,y of R, G, B, W | parameter (1,n)=x,y of R, G, B, W | … | parameter (n,n)=x,y of R, G, B, W |

FIG. 4

METHOD AND SYSTEM FOR CALCULATING ADAPTIVE PANEL COLOR PARAMETERS

CROSS-REFERENCE TO RELATED PATENT APPLICATION

This application claims the benefit of priority to Taiwan Patent Application No. 112118216, filed on May 17, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a panel display technology, and more particularly to a method for calculating adaptive panel color parameters according to current environmental parameters of a display panel and a system performing the same.

BACKGROUND OF THE DISCLOSURE

With the rapid development of modern technology, a variety of display devices have been introduced to the consumer market, and users also have increasingly strict requirements on color accuracy of the displays. Accordingly, in order to achieve color accuracy of the displays, color characteristics of panels of the displays can be measured by a measurement instrument and will be corrected if necessary before factory shipment of the displays. The color correction allows images of the displays to be compensated by a hardware circuit and approach a state of true colors.

Reference is made to FIG. 1, which is a diagram showing a conventional method for correcting colors of a panel. In a display device, specific circuits and software are used to process images at different stages. In an image-processing process, a target color space is firstly determined, and then a color analyzer is used to measure data of a display panel. After that, the colors of the display panel are processed through a pre-gamma process (101), a color transfer matrix (103), and a post-gamma process (105). The objective of the processes performed on the colors of the display panel is to calibrate the image data of the display device, so as to reach a target color gamut. Then, the display device is able to output a picture with a proper color gamut.

According to the functional block diagram of the image-processing process shown in FIG. 1, the input image data can be non-linear color values 11, and the non-linear color values 11 (i.e., non-linear RGB) are non-linear RGB image data. The pre-gamma processing (101) is to linearize codes within a non-linear color space. In this way, the non-linear RGB image data can be converted to linear color values 13 with a target color gamut, so that the following hardware is able to perform calculation in a linear space. The color transfer matrix (103) is incorporated to perform linear color space conversion, so as to obtain linear target color values 15 (i.e., linear R'G'B'). Therefore, linear codes with the target color gamut can be displayed on a panel with linear codes of a native color gamut. When the target color values 15 are obtained, the target color values 15 are processed by the post-gamma process (105). The image data can be converted by hardware according to information of brightness and then outputted to a display panel 107 based on a linear relationship between native color values inputted to the panel and the brightness.

The display panel is firstly turned on in a common calibration process. The panel can reach a stable state of temperature and liquid crystal after a warm-up period with a fixed brightness of backlight. The warm-up period (e.g., 30 minutes) can be determined according to the property of the panel. As such, a terminal user can see a displayed picture with correct colors by waiting for a period of time after the display device is turned on. Moreover, the brightness of the display device can be adjusted generally by changing an electric current or through a pulse-width modulation. The temperature of the display panel may also be changed accordingly, thereby affecting color performance of the panel.

However, even though the above-mentioned problem of the display panel is acknowledged, the conventional calibration process of the panel in a panel factory is only performed at a fixed voltage or current with a fixed temperature. Therefore, the color accuracy may be not as expected if the display panel adopts calibration parameters of the factory at a different brightness and a different temperature.

SUMMARY OF THE DISCLOSURE

In order for a display panel to output images with correct colors anytime, the present disclosure provides a method for calculating adaptive panel color parameters and an adaptive panel-color-parameter calculation system. The method allows the display panel to adaptively adopt the panel color parameters according to current or at the moment environmental conditions, so that the display panel can display the images with the correct colors at any time.

In one embodiment of the present disclosure, the adaptive panel-color-parameter calculation system can be an arithmetic circuit that is implemented by a circuitry or a firmware. In one implementation, the adaptive panel-color-parameter calculation system can be operated as the firmware in a control circuit that is used to control an on-screen menu displayed on the display panel and to control the display parameters.

According to one embodiment of the method for calculating the adaptive panel color parameters, the main steps include: obtaining current environmental parameters of a display panel; obtaining color characteristic parameters of the display panel by querying a panel-characteristic lookup table according to the current environmental parameters; updating a color transfer matrix according to target values and the color characteristic parameters of the display panel, and generating panel color parameters with the color transfer matrix; and providing the updated panel color parameters to a driver circuit of the display panel, so that the display panel displays a picture with the updated panel color parameters.

Further, the target values are predetermined target color values with red, green and blue values for the display panel, and the updated color transfer matrix is used to compensate differences between colors displayed by the display panel under the current environmental parameters and the target color values.

Further, a memory is used to store the panel-characteristic lookup table. Through querying a panel-characteristic lookup table or referring to the panel-characteristic lookup table, an interpolation method is applied to for obtaining the color characteristic parameters corresponding to the current environmental parameters of the display panel.

Preferably, the current environmental parameters of the display panel include at least one of a current, a voltage or a current temperature that are measured by a sensor, and the display panel is driven by the current and the voltage. The current temperature of the display panel can be sensed by a temperature sensor that is built in the display panel or externally mounted on the display panel.

Further, through measuring changes of a color gamut of the display panel at different currents and temperatures, the color characteristic parameters of the display panel are formed for establishing the panel-characteristic lookup table.

Further, through querying the panel-characteristic lookup table, the color gamut and chromaticity of reference white of the display panel are obtained for calculation of a transfer matrix that is used to convert three primary color values (RGB) to tristimulus values (XYZ). Further, a target transfer matrix that is used to convert predetermined tristimulus values of a target color gamut of the display panel to the three primary color values is also provided. The transfer matrix and the target transfer matrix are used together to calculate the color transfer matrix.

Further, the driver circuit drives the display panel to display a video frame-by-frame. When the updated color transfer matrix is obtained, a timing for updating the panel color parameters of the display panel through application of the panel color parameters generated by the color transfer matrix can be determined based on a video timing.

An original color transfer matrix of the video is updated by the color transfer matrix within a blanking period between two frames based on the video timing, and the updated panel color parameters take effect on a next frame.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 4 is a schematic diagram of a panel-characteristic lookup table that is adopted in the method for calculating the adaptive panel color parameters according to one embodiment of the present disclosure;

DETAILED DESCRIPTION OF THE EXEMPLARY EMBODIMENTS

Figure 1:
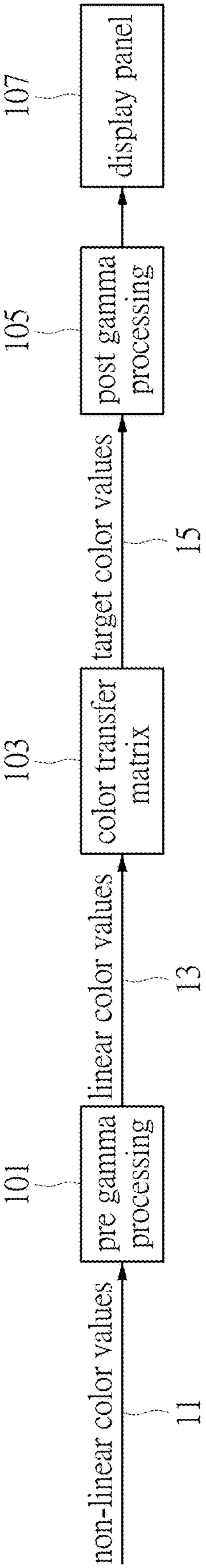
FIG. 1 RELATED ART
FIG. 1 is a schematic diagram illustrating a conventional process for correcting panel colors.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In order for a display device to display correct colors at any time even if the display device is not warmed up for enabling a display panel to reach a stable state of temperature and liquid crystal, the present disclosure provides a method for calculating adaptive panel color parameters and an adaptive panel-color-parameter calculation system. A color parameter calculation model is generally provided for allowing the display panel to be compensated by circuits, so as to display images with correct colors based on current environmental conditions (e.g., temperature and electrical properties) at any time. Therefore, color errors produced in a general calibration process can be improved. According to one embodiment of the present disclosure, in the method, a color analyzer measures color characteristics of the display panel, and the display panel can be compensated by the circuits in order to output images with correct colors based on environmental conditions of the display panel.

According to one embodiment of the method for calculating the adaptive panel color parameters of the present disclosure, the method is applied to the display panel for adjusting panel color parameters of the display panel, so that images with correct colors can be displayed according to the current environmental conditions. Before the method for calculating the adaptive panel color parameters is performed, a panel-characteristic lookup table for the display panel is established. The panel-characteristic lookup table records color characteristic parameters that are formed based on changes of a color gamut and chromaticity of reference white of the display panel at different currents and temperatures.

In an RGB color space of the display panel, digital signals of colors can be expressed by RGB values that belong to a non-linear system. Further, tristimulus values expressed as X, Y, and Z that belong to a linear system are physical quantities for indicating color intensity perceived by human. A transfer matrix can be used to perform conversion between the two systems. Particularly, the non-linear system having the RGB values can be converted to the linear system by a gamma transformation, and then mixed with the transfer matrix for obtaining the tristimulus values (i.e., the XYZ values).

Next, for the display panel, the transfer matrix and a target color space are determined for converting the RGB values to the XYZ values. Further, the color characteristics obtained by querying a lookup table or performing an interpolation method are referred to for determining a color transfer matrix that is used to convert the XYZ values to the RGB values. Based on the fact that the colors displayed on the display panel vary in response to changes of the environmental conditions, the method for calculating the adaptive panel color parameters of the present disclosure is performed for adaptively modifying the color transfer matrix according to the current environmental conditions of the display panel. Therefore, the display panel can display correct colors at any time.

Figure 2:
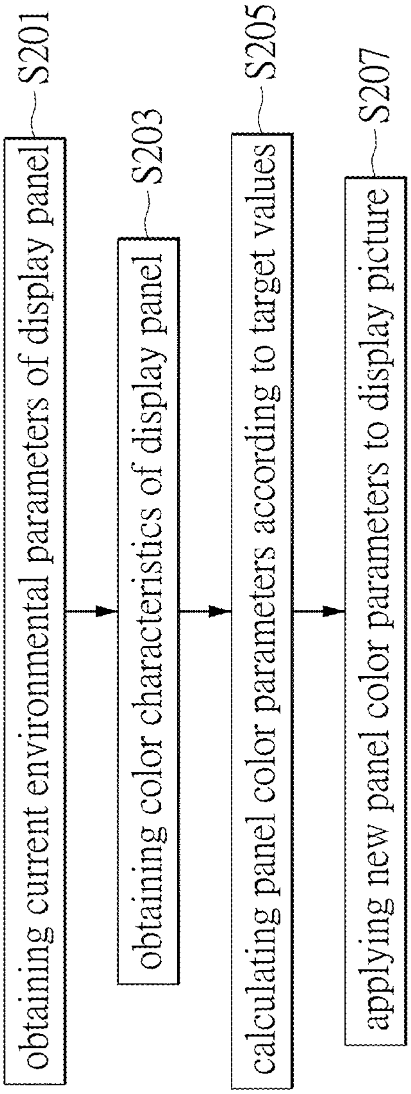
FIG. 2 is a flowchart illustrating a method for calculating adaptive panel color parameters according to one embodiment of the present disclosure.

Reference is made to FIG. 2, which is a flowchart illustrating the method according to one embodiment of the present disclosure.

In the beginning, such as in step S201, a sensor circuit is used to acquire current environmental parameters of the display panel. The environmental parameters can particularly be the environmental parameters that will affect the colors to be displayed by the display panel. For example, the environmental parameters are the current or voltage used to drive the display panel, and the changing temperature. Next, in step S203, the color characteristic parameters of the display panel can be obtained according to the current environmental parameters of the display panel. A main method is to query the panel-characteristic lookup table for obtaining the color characteristic parameters. If the panel-characteristic lookup table does not have the color characteristic parameters corresponding to the current environmental parameters, the interpolation method can be performed based on the panel-characteristic lookup table in order to obtain the proper color characteristic parameters corresponding to the current environmental parameters of the display panel.

In step S205, a color transfer matrix is updated based on the color characteristic parameters obtained by querying the table according to predetermined target values for the display panel. The target values are predetermined target color values with red, green and blue values. The updated color transfer matrix is used to compensate differences between colors displayed by the display panel under the current environmental parameters and the target color values. Thus, the updated color transfer matrix is used to generate new panel color parameters. Afterwards, such as in step S207, the new panel color parameters are provided to a driver circuit of the display panel, so as to apply the new panel color parameters to the display panel for displaying images.

Figure 3:
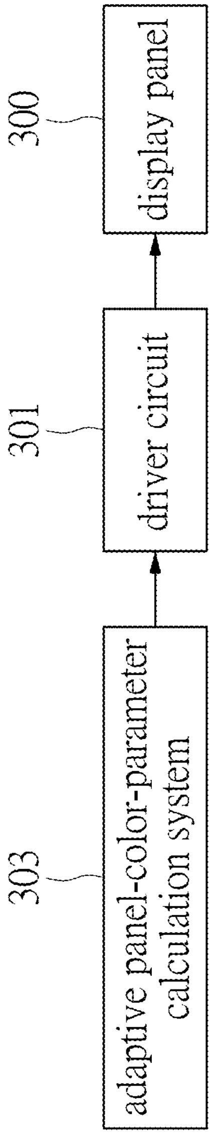
FIG. 3 is a schematic diagram illustrating a concept of a system that incorporates the panel color parameters that are currently calculated.

According to one embodiment of the adaptive panel-color-parameter calculation system, reference is made to FIG. 3, which is a schematic diagram illustrating a concept of a system that incorporates the panel color parameters that are currently calculated.

A display panel 300 that is applicable to the method for calculating the adaptive panel color parameters is shown in the diagram. In the display panel 300, the panel color parameters include post-gamma parameters and the color transfer matrix. The post-gamma parameters allow linear target color values (e.g., linear R'G'B' values) inputted to the display panel and the brightness to have a linear relationship. According to the linear relationship between the linear target color values and the brightness, the brightness of the display panel can be referred to for acquiring color information of the images that are processed by hardware and outputted to the display panel. Based on the impact of the environmental parameters against the display panel, the method for calculating the adaptive panel color parameters is to calibrate the post-gamma parameters by determining the target color values, and allows the display panel to display images with correct colors anytime through the currently-updated color transfer matrix.

In the adaptive panel-color-parameter calculation system that performs the method for calculating the adaptive panel color parameters, a memory is provided for storing the panel-characteristic lookup table that records panel-characteristic parameters corresponding to various environmental parameters of the display panel. In certain embodiments of the present disclosure, the panel-characteristic lookup table can be stored to a specific memory (e.g., a flash memory) of the display device. The display device includes a driver circuit 301 that is used to drive the display panel 300. The driver circuit 301 connects with an adaptive panel-color-parameter calculation system 303 that is implemented by logic circuits, hardware circuits, or a firmware. In one embodiment of the present disclosure, the adaptive panel-color-parameter calculation system 303 can be operated in a control circuit that is used to control an on-screen menu displayed on the display panel 300 and the display parameters in a form of the firmware. The driver circuit 301 then obtains the updated color transfer matrix from the adaptive panel-color-parameter calculation system 303, and the updated color transfer matrix is applied to a video displayed on the display panel 300.

FIG. 4 is a schematic diagram depicting a panel-characteristic lookup table adopted in the method for calculating the adaptive panel color parameters according to one embodiment of the present disclosure. The panel-characteristic lookup table is used to record the color characteristic parameters of the display panel at different currents and temperatures. In one implementation, through measuring the changes of the color gamut and the chromaticity of the reference white of the display panel at different currents and temperatures, the color characteristic parameters of the display panel can be formed for establishing the panel-characteristic lookup table.

According to an exemplary example of the panel-characteristic lookup table shown in the diagram, horizontal rows in the table show values of the temperature (which is one of the environmental parameters). The temperatures shown in the table are exemplarily expressed by temperature 0, temperature 1, temperature 2 to temperature n that are from a minimum temperature (Tmin) to a maximum temperature (Tmax) of the display panel. Vertical columns in the table show values of the current (which is another one of the environmental parameters). The currents shown in the table are exemplarily expressed by current 0, current 1, current 2 to current n that are from a minimum current (min mA) to a maximum current (max mA) of the display panel. Accordingly, the panel-characteristic lookup table allows the adaptive panel-color-parameter calculation system to acquire the color characteristics that are obtained by measuring grayscale and RGB colors displayed by the display panel at different currents, voltages, and temperatures.

In one of the embodiments of the present disclosure, before the display panels are being shipped, the changes of the color gamut and the chromaticity of the reference white of the display panel at different currents, voltages, and temperatures can be measured, and these values are stored to a specific memory. Specifically, a communication protocol (e.g., $I^2C$) can be used for transmitting these values to the memory.

The panel-characteristic lookup table records the color characteristic parameters corresponding to different temperatures and currents. The present example shows that the color characteristic parameter corresponding to temperature 0 and current 0 is "(0,0)=x,y of R, G, B, W", which represents chromatic coordinates (x, y) of red (R), green (G), blue (B), and white (W) under the environmental parameters. For example, the chromatic coordinates (x, y) denote coordinates of red, green, blue, and white colors in a CIE1931 color space. Similarly, the color characteristic parameter corresponding to temperature 1 and current 1 is "(1,1)=x,y of R, G, B, W", and the color characteristic parameter corresponding to temperature n and current n is "(n,n)=x,y of R, G, B, W."

By querying the panel-characteristic lookup table, the color characteristic parameters corresponding to the maximum current and the maximum temperature can be referred to for calibrating the post-gamma parameters or the color transfer matrix in the driver circuit. Then, the parameters can be stored to a memory of the adaptive panel-color-parameter calculation system. The parameters can be used when driving the display panel to work.

In the method for calculating the adaptive panel color parameters of the present disclosure, the panel color parameters are obtained according to the current environmental parameters of the display panel, and the panel color parameters are provided to the driver circuit. The driver circuit then compensates the color parameters of the display panel.

Figure 5:
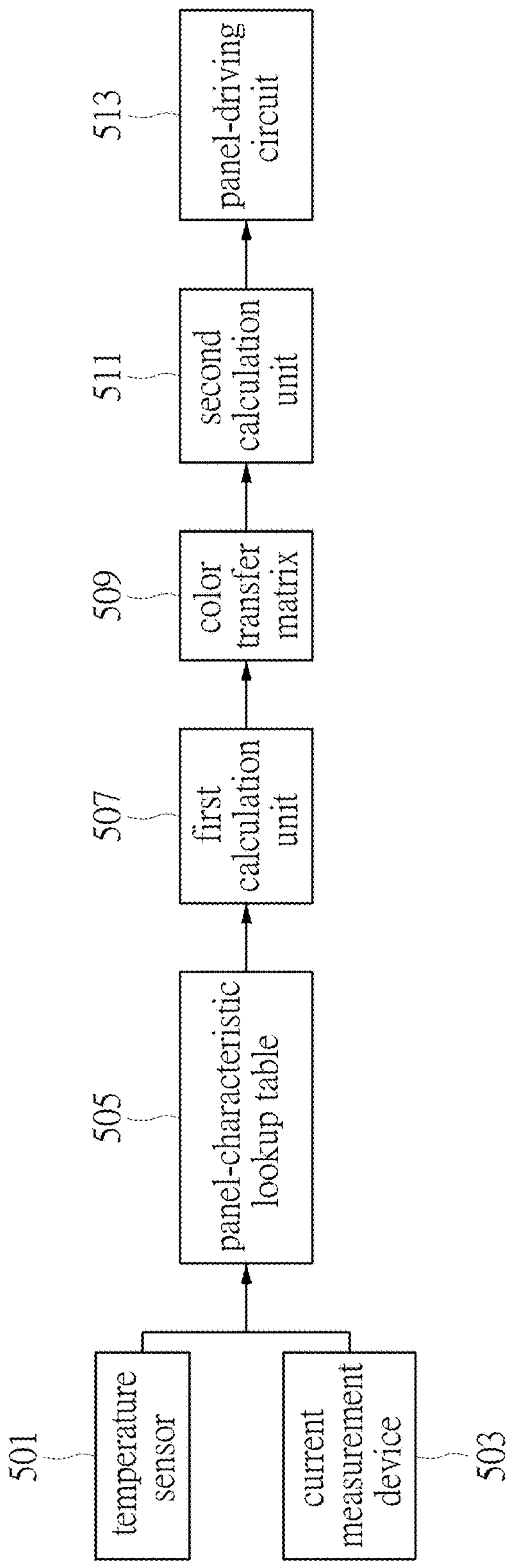
FIG. 5 is a schematic diagram illustrating a process of calculating the adaptive panel color parameters according to one embodiment of the present disclosure.

FIG. 5 is a schematic diagram illustrating a process of calculating the adaptive panel color parameters according to one embodiment of the present disclosure.

In the present embodiment, various sensors can be used to measure the current environmental parameters of the display panel. For example, a temperature sensor 501 that is built in the display panel or externally mounted on the display panel can be used to sense a current temperature of the display panel. A current measurement device 503 then measures the electrical properties (such as currents or voltages) that drive the display panel, or the current temperature. Thus, the current environmental parameters of the display panel are referred to for querying a panel-characteristic lookup table 505, so as to obtain the color characteristic parameters of the display panel.

It should be noted that, when the display device is in operation, the temperature changes as the display panel operates. The driver circuit of the display panel is used to adjust a driving current and then modulate a backlight of the display panel. In addition to obtaining the current, a temperature sensor that is built in the display panel or externally mounted on the display panel is used to acquire the current temperature. These current environmental parameters (i.e., the current and the temperature) are referred to for querying the panel-characteristic lookup table 505 or for applying the interpolation method, so as to obtain the current color characteristic parameters of the display panel.

After that, an arithmetic circuit implemented by the adaptive panel-color-parameter calculation system, e.g., a first calculation unit 507, relies on a target value and the color characteristic parameters obtained from the panel-characteristic lookup table 505 to update a color transfer matrix 509. An arithmetic circuit, e.g., a second calculation unit 511, further generates a set of panel color parameters with the color transfer matrix 509, and provides the panel color parameters to a driver circuit 513 of the display panel.

According to one of the embodiments of obtaining the color transfer matrix, in the process of calculating the adaptive panel color parameters, the panel-characteristic lookup table is queried after the current environmental parameters of the display panel are obtained, so as to obtain a color gamut and chromaticity of reference white of the display panel. A transfer matrix that is used to convert the three primary color values (RGB) to the tristimulus values (XYZ) is calculated. A target transfer matrix that is used to convert the predetermined tristimulus values (XYZ) of a target color gamut to the three primary color values (RGB) is calculated. The transfer matrix and the target transfer matrix are used together to calculate the color transfer matrix. Thus, in the adaptive panel-color-parameter calculation system, via hardware or firmware, the transfer matrix obtained from the current environmental parameters of the display panel and the target transfer matrix determined for the display panel are used together to perform a matrix operation, so as to obtain a current color transfer matrix.

According to one embodiment of the present disclosure, when the display device receives video data, the driver circuit drives the display panel to display a video frame-by-frame. When the updated color transfer matrix is obtained, a timing at which the panel color parameters generated by the color transfer matrix take effect can be determined based on a video timing, so as to calibrate color parameters of the display panel.

Figure 6:
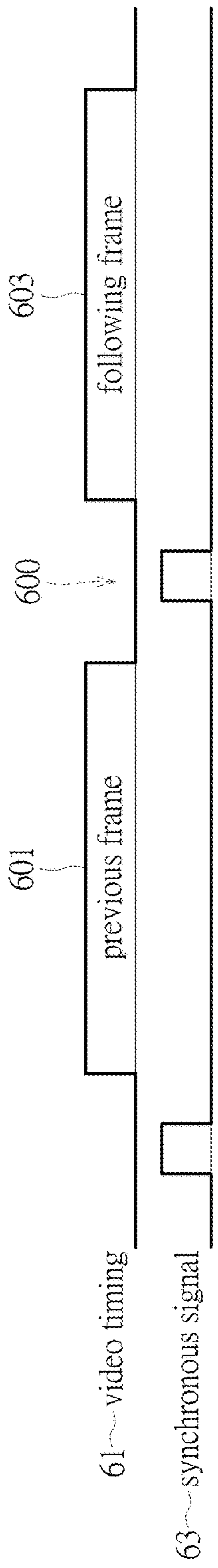
FIG. 6 is a schematic diagram depicting a video timing when applying the adaptive panel color parameters according to one embodiment of the present disclosure.

An operation timing of the adaptive panel-color-parameter calculation system can refer to FIG. 6, which is a schematic diagram illustrating a video timing when applying the adaptive panel color parameters in one embodiment of the present disclosure. The mentioned driver circuit of the display panel generates a synchronous signal 63, and the synchronous signal 63 is referred to for driving the display panel to display a video according to a video timing 61. When the panel color parameters are obtained through the updated color transfer matrix, the panel color parameters are provided to the driver circuit of the display panel. Therefore, the driver circuit allows new panel color parameters to take effect anytime.

According to one embodiment of the method for calculating the adaptive panel color parameters of the present disclosure, the driver circuit uses the color transfer matrix to update an original color transfer matrix of the video within a blacking period that is determined between two frames (e.g., a previous frame 601 and a following frame 603) according to the video timing 61. The updated panel color parameters will take effect at a next frame. It should be noted that, when the original color transfer matrix of the video is updated with a new color transfer matrix within the blanking period between the two frames so as to output a picture that is consistent with target colors, the timing of applying the new color transfer matrix to be determined can effectively avoid the problem of screen tearing during a parameter updating process.

Preferably, in one further embodiment of the present disclosure, the driver circuit drives the display panel to display a video that includes a series of frames. The driver circuit can detect an ending time of each of the frames, and the ending time is referred to as an end of active video. A blanking period before a next frame to be displayed can be a timing (i.e., a time point 600) between the previous frame 601 and the following frame 603 shown in the diagram for updating the panel color parameters. Further, this time point 600 is also the period for updating the original color transfer matrix of the video. The updated panel color parameters will take effect on the next frame.

Figure 7:
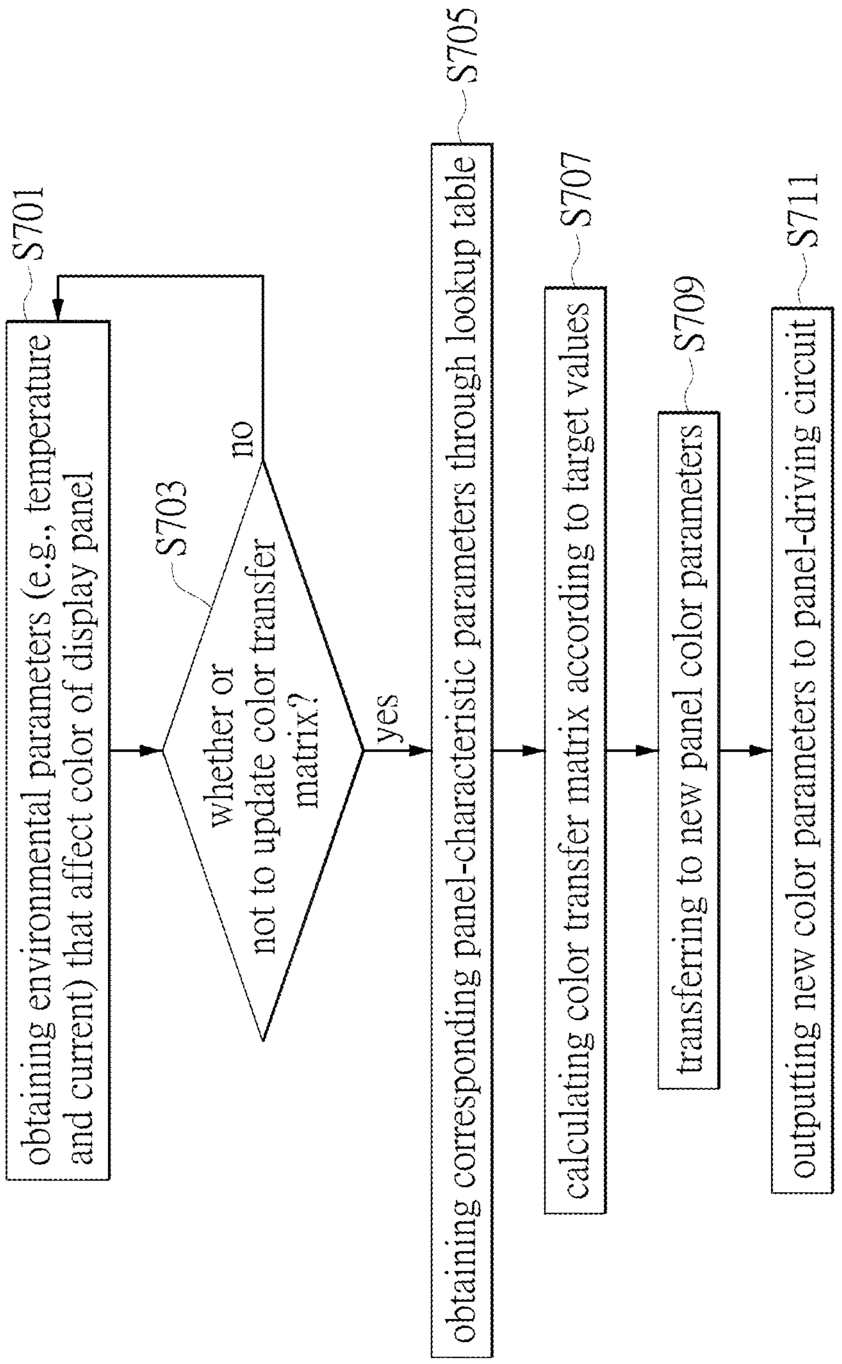
FIG. 7 is a flowchart illustrating the method for calculating the adaptive panel color parameters according to one embodiment of the present disclosure.

To summarize the above embodiments of the method for calculating the adaptive panel color parameters and the adaptive panel-color-parameter calculation system, reference is made to FIG. 7, which is a flowchart illustrating an overall process of the method according to one embodiment of the present disclosure.

In the process of the method for calculating the adaptive panel color parameters, the adaptive panel-color-parameter calculation system periodically obtains the environmental parameters that will affect the colors of the display panel from the sensors. The environmental parameters are, for example, the currents or voltages, and the temperatures that increase as the display panel operates (step S701). In the meantime, thresholds of various environmental parameters are introduced. The thresholds can be upper limits or lower limits of the currents, voltages and/or temperatures. Especially before the display panel is warmed up, the environmental parameters are referred to for determining whether or not to update the color transfer matrix (step S703). If the environmental parameters do not meet the thresholds that will affect the colors of the display panel (determined as "no"), the process returns to step S701 for continuously measuring the environmental parameters that will affect the colors of the display panel. If the environmental parameters meet the thresholds that require updating the color transfer matrix (determined as "yes"), the pane-characteristic lookup table stored in the memory is queried for acquiring the corresponding panel-characteristic parameters (step S705). In case that no corresponding panel-characteristic parameters are found when querying the panel-characteristic lookup table, the interpolation method is performed to obtain the color characteristic parameters corresponding to the current environmental parameters (such as the current temperature and current) by referring to the panel-characteristic lookup table.

After that, according to the panel-characteristic parameters (e.g., the color gamut and the chromaticity of the reference white of the display panel), a transfer matrix that converts the three primary color values (i.e., RGB values) to the tristimulus values (i.e., XYZ values) is calculated. Next, a new color transfer matrix is calculated according to the color transfer matrix of the target color values (step S707), and then the new panel color parameters can be obtained (step S709). The new panel color parameters are outputted to the driver circuit of the display panel, so that the new panel color parameters can take effect at a specific time. Finally, a post-gamma processing is performed for the display panel to display the images with the desired colors.

In summation, since the various display panels have their own color gamut diagrams and their own color characteristics, there will be differences between the original input video and the target color values, e.g., the differences of the RGB values. Different from the conventional display panel that requires a warm-up process to provide correct colors, the method for calculating the adaptive panel color parameters and the adaptive panel-color-parameter calculation system of the present disclosure can currently update the color transfer matrix of the display panel by currently measuring the environmental parameters that will affect the colors of the display panel. The updated color transfer matrix can be used for converting the video in a non-linear color space to the video in a linear color space. Therefore, the method allows the various display panels to display images with correct colors in any situations. Further, no matter how a user adjusts the backlight of the display panel, the display panel can still display images with correct colors through recalculation of the color transfer matrix.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for calculating adaptive panel color parameters, comprising:

obtaining current environmental parameters of a display panel;

obtaining color characteristic parameters of the display panel according to the current environmental parameters;

updating a color transfer matrix according to target values and the color characteristic parameters of the display panel, and generating panel color parameters with the updated color transfer matrix; and providing the panel color parameters to a driver circuit of the display panel, so as to apply to the display panel with the panel color parameters generated with the color transfer matrix;

wherein the driver circuit drives the display panel to display a video frame-by-frame; wherein, when the updated color transfer matrix is obtained, an original color transfer matrix of the video is updated by the color transfer matrix within a blanking period between two frames based on a video timing, and a timing for updating color parameters of the display panel through application of the panel color parameters generated by the color transfer matrix is determined based on the video timing, afterwards, the updated panel color parameters take effect on a next frame.

2. The method according to claim 1, wherein the target values are predetermined target color values with red, green, and blue values for the display panel, and the updated color transfer matrix is used to compensate differences between colors displayed by the display panel under the current environmental parameters and the target color values.

3. The method according to claim 1, wherein, when the panel color parameters are provided to the driver circuit, the driver circuit controls a current applied to the display panel for changing brightness of a backlight, so as to compensate the color parameters of the display panel.

4. The method according to claim 1, wherein, after a panel-characteristic lookup table is queried or referred to, an interpolation method is applied for obtaining the color characteristic parameters corresponding to the current environmental parameters of the display panel.

5. The method according to claim 4, wherein the current environmental parameters of the display panel include at least one of a current, a voltage, or a current temperature that are measured by a sensor, and the display panel is driven by the current, the voltage, and/or the current temperature.

6. The method according to claim 4, wherein, through measuring changes of a color gamut and chromaticity of reference white of the display panel at different currents and temperatures, the color characteristic parameters of the display panel are formed for establishing the panel-characteristic lookup table.

7. The method according to claim 4, wherein, through querying the panel-characteristic lookup table, the recorded color characteristic parameters of the display panel that correspond to a maximum current and a maximum temperature are obtained and used to calibrate post-gamma parameters of the driver circuit.

8. The method according to claim 7, wherein, through querying the panel-characteristic lookup table, a color gamut and chromaticity of reference white of the display panel are obtained for calculation of a transfer matrix that is used to convert three primary color values to tristimulus values; wherein the transfer matrix and a target transfer matrix that is used to convert predetermined tristimulus values of a target color gamut of the display panel to the three primary color values are used to calculate the color transfer matrix.

9. An adaptive panel-color-parameter calculation system, which is an arithmetic circuit implemented by a circuitry or a firmware, performing a method for calculating adaptive panel color parameters, wherein the method comprises:

obtaining current environmental parameters of a display panel;

obtaining color characteristic parameters of the display panel according to the current environmental parameters;

updating a color transfer matrix according to target values and the color characteristic parameters of the display panel, and generating panel color parameters with the updated color transfer matrix; and providing the panel color parameters to a driver circuit of the display panel, so as to apply the panel color parameters obtained by the color transfer matrix to the display panel;

wherein the driver circuit drives the display panel to display a video frame-by-frame; wherein, when the updated color transfer matrix is obtained, an original color transfer matrix of the video is updated by the color transfer matrix within a blanking period between two frames based on a video timing, and a timing for updating color parameters of the display panel through application of the panel color parameters generated by the color transfer matrix is determined based on the video timing, afterwards, the updated panel color parameters take effect on a next frame.

10. The adaptive panel-color-parameter calculation system according to claim 9, wherein the adaptive panel-color-parameter calculation system is operated as the firmware in a control circuit that is used to control an on-screen menu displayed on the display panel and to control display parameters.

11. The adaptive panel-color-parameter calculation system according to claim 9, wherein the target values are predetermined target color values with red, green and blue values for the display panel, and the updated color transfer matrix is used to compensate differences between colors displayed by the display panel under the current environmental parameters and the target color values.

12. The adaptive panel-color-parameter calculation system according to claim 9, wherein a memory is used to store a panel-characteristic lookup table; wherein, after the panel-characteristic lookup table is queried or referred to, an interpolation method is applied for obtaining the color characteristic parameters corresponding to the current environmental parameters of the display panel.

13. The adaptive panel-color-parameter calculation system according to claim 12, wherein the current environmental parameters of the display panel include at least one of a current, a voltage or a current temperature that are measured by a sensor, and the display panel is driven by the current and the voltage.

14. The adaptive panel-color-parameter calculation system according to claim 13, wherein the current temperature of the display panel is sensed by a temperature sensor that is built in the display panel or externally mounted on the display panel.

15. The adaptive panel-color-parameter calculation system according to claim 12, wherein, when changes of color gamut and chromaticity of reference white of the display panel at different currents and temperatures are measured, the color characteristic parameters of the display panel are formed for establishing the panel-characteristic lookup table.

16. The adaptive panel-color-parameter calculation system according to claim 15, wherein, through querying the panel-characteristic lookup table, the color gamut and the chromaticity of the reference white of the display panel are obtained for calculation of a transfer matrix that is used to convert three primary color values to tristimulus values; wherein the transfer matrix and a target transfer matrix that is used to convert predetermined tristimulus values of a target color gamut of the display panel to the three primary color values are used to calculate the color transfer matrix.

* * * * *